United States Patent [19]

Deutsch et al.

[11] 4,326,556
[45] Apr. 27, 1982

[54] APPARATUS FOR SEALING THE PERIPHERY OF AN OPENING

[75] Inventors: Hans Deutsch; Norbert Heger, both of Vienna, Austria

[73] Assignee: Waagner-Biro Aktiengesellschaft, Vienna, Austria

[21] Appl. No.: 129,014

[22] Filed: Mar. 7, 1980

[30] Foreign Application Priority Data

Mar. 8, 1979 [AT] Austria ................................. 1731/79

[51] Int. Cl.³ ............................. F16K 9/00; B08B 3/02
[52] U.S. Cl. ...................................... 137/240; 34/242; 110/171; 134/104; 134/114; 137/251; 277/135; 432/242
[58] Field of Search ........................ 34/242; 110/171; 137/240, 247.11, 247.33, 238, 251; 277/135; 432/242; 134/104, 114

[56] References Cited

U.S. PATENT DOCUMENTS

| | | | |
|---|---|---|---|
| 1,633,562 | 6/1927 | Allen | 110/171 |
| 2,347,549 | 4/1944 | Foresman | 110/171 |
| 3,580,226 | 5/1971 | Blackburn, Jr. et al. | 110/171 |
| 3,732,993 | 5/1973 | Csapo | 432/242 |
| 3,741,235 | 6/1973 | Ambrose et al. | 134/104 |
| 3,834,328 | 9/1974 | Blazewicz | 110/171 |
| 4,103,902 | 8/1978 | Steiner et al. | 277/135 |

Primary Examiner—Martin P. Schwadron
Assistant Examiner—G. L. Walton
Attorney, Agent, or Firm—Steinberg & Raskin

[57] ABSTRACT

Apparatus for sealing the periphery of an opening such, for example, as an opening through which bulk material is fed into a bin, a shaft opening through which hot bulk material is cooled, or an opening in a blast furnace shaft, of the type wherein a channel extends around the periphery of the opening into which a dividing wall extends whose lower end is spaced from the channel bottom so as to define a pair of adjacent channel portions which intercommunicate through the space between the lower end of the dividing wall and the channel bottom so that liquid provided in the channel at least fills the communicating space. According to the invention, a pair of external channels are provided, each of which is adjacent to and extends around one of the inner and outer sides of the peripherally extending channel, respectively, so that the latter comprises an inner channel. A liquid inlet communicates with the inner channel so that liquid continuously supplied into the inner channel will continuously overflow over at least one of the walls which separates the inner channel from one of the outer channels so that the liquid can be removed from the external channel into which the liquid overflows through outlet means.

10 Claims, 4 Drawing Figures

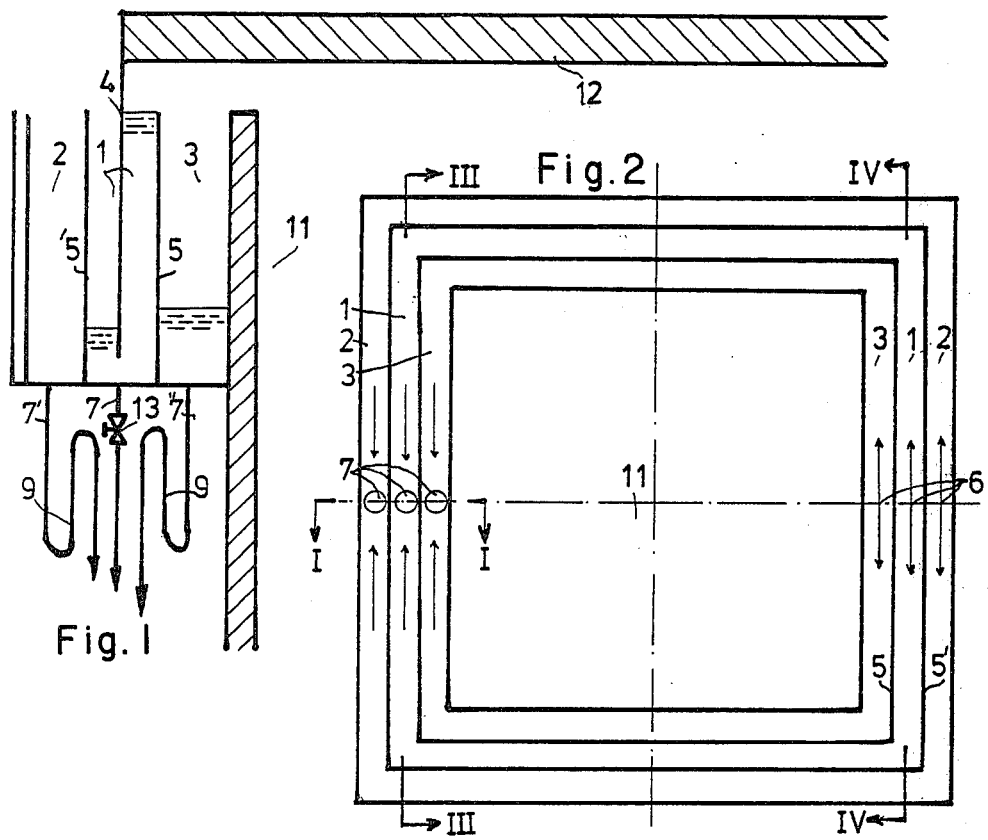

APPARATUS FOR SEALING THE PERIPHERY OF AN OPENING

BACKGROUND OF THE INVENTION

This invention relates generally to apparatus for sealing the periphery of an opening and, more particularly, to sealing apparatus for sealing the periphery of an opening such, for example, as the feed opening of a bulk material bin, or the opening of a charge container for a shaft cooler for hot bulk material, or an opening of a shaft furnace, wherein a channel extends around the periphery of the opening and a dividing wall extends into the channel, the latter being filled with liquid to effect the seal.

So-called water seals wherein a channel extends around the periphery of the opening to be sealed and into which a dividing wall extends so that the channel is filled with liquid to effect the seal are known. Such known sealing arrangements, however, are not entirely satisfactory in that on one hand liquid often spills from the channel when the relative pressures within the opening and the outer atmosphere change. In this connection, the dividing channel will function as a U-type manometer so that the level of the liquid on one side of the dividing wall (the low pressure side) will rise and possibly overflow. On the other hand, such sealing arrangements tend to become clogged with mud and other debris as a result of the collection of dust during the filling of the apparatus whose opening is being sealed (e.g., the bulk material bin) and, therefore, such sealing arrangements require constant maintenance. In view of the foregoing, such conventional water seals are not especially suited for use in connection with sealing openings through which bulk material which generate large quantities of dust and other particulate byproducts is passed. Additionally, conventional water seals are not particularly suitable when bulk material which is water sensitive is passed through the opening intended to be sealed.

SUMMARY OF THE INVENTION

Accordingly, one object of the present invention is to provide new and improved apparatus for peripherally sealing openings of the type described above which overcome the particular disadvantages discussed above.

Another object of the present invention is to provide new and improved water seal apparatus having increased operating reliability.

Still another object of the present invention is to provide new and improved water seal apparatus having the capability of self-cleaning.

Briefly, in accordance with the present invention, these and other objects are attained by providing a pair of external channels, each of the external channels being adjacent to and extending around one of the inner and outer sides of the peripherally extending channel, respectively, so that the latter comprises an inner channel located between the pair of external channels.

A liquid inlet communicates with the inner channel through which a liquid can be continuously supplied into the inner channel in a manner such that the liquid can continuously overflow into one of the external channels from which the liquid can then be removed through suitable outlets. In this manner, accumulated debris can be removed from the channels.

Means are provided whereby a jet of liquid can be directed at least into the inner channel and, preferably, into both the inner and external channels for rinsing the same.

Further, the bottom of each of the inner and external channels are preferably inclined downwardly in the direction of the liquid outlets so as to facilitate the removal of liquid therefrom. Other additional features of the invention will become apparent in the description of the invention below.

DESCRIPTION OF THE DRAWINGS

A more complete appreciation of the present invention and many of the attendant advantages thereof will become apparent in the following detailed description when considered in connection with the accompanying drawings in which:

FIG. 1 is a schematic side elevation view in partial section illustrating the sealing apparatus of the present invention, FIG. 1 comprising a section view taken lines I—I of FIG. 2;

FIG. 2 is a schematic plan view illustrating the sealing arrangement of the present invention;

FIG. 3 is a schematic section view taken along line III—III of FIG. 2; and

FIG. 4 is a schematic section view taken along line IV—IV of FIG. 2.

DESCRIPTION OF THE PREFERRED EMBODIMENT

Referring now to the drawings wherein like reference characters designate identical or corresponding parts throughout the several views, the sealing arrangement of the present invention is illustrated as being utilized in connection with sealing the periphery of a rectangular feed opening 11 as best seen in FIG. 2. An inner channel or groove 1 extends around the periphery of the opening 11. A dividing wall 4 extends into the channel 1, the lower end of dividing wall 4 being spaced from the bottom of channel 1 so as to define a pair of adjacent channel portions which intercommunicate through the space between the lower end of the dividing wall 4 and the bottom of channel 1. The channel 1 is filled with liquid, such as water, to an extent such that the level of the liquid in the channel portions exceeds the height of the lower end of the dividing wall 4.

A cover 12 extends over the opening 11 from which the dividing wall 4 extends downwardly into the channel 1 so that the space defined by the opening and cover 12 is substantially sealed by means of the water contained within the channel 1. As a result of any difference in pressure between the enclosed space and the external atmosphere, the level of water in the channel portions on either side of the dividing wall 4 are uneven. According to the invention, a pair of external channels 2, 3 are provided, each of which is adjacent to and extends around one of the inner and outer sides of the peripherally extending channel 1. Thus, external channel 2 extends around the outer side of channel 1 while external channel 3 extends around the inner side of channel 1. First and second intermediate walls 5, 5' separate the external channels 3, 2 from the inner channel 1 as illustrated in FIG. 1. In the illustrated embodiment, the pressure of the external atmosphere exceeds the pressure within the sealed interior space so that the liquid contained in channel 1 overflows over the intermediate wall 5 into the external channel 3. Of course, it is understood that if the pressure in the sealed space was greater than that of the external atmosphere, the liquid contained in channel 1 would overflow over the dividing wall 5' into the external channel 2.

The external channels 2, 3 have permanent liquid outlets 7', 7", respectively with which siphons 9 are respectively associated so that in this manner, no air can penetrate into the internal space 11 when the external channels 2, 3 are empty. The inner channel 1 is also provided with a liquid outlet 7 with which a control valve 13 is associated. Thus, the inner channel 1 can be completely emptied by opening the control valve 13 so that any mud or other debris collected therein can be removed. Of course, it is recognized that during such cleaning of the inner channel wherein the water contained therein is emptied, the sealing provided by the arrangement is eliminated, it is pointed out that the provision of such liquid outlet and associated control valve greatly simplifies the maintenance of the inner channel. Thus, conventional water seals are presently cleaned by periodically shoveling debris deposited therein so that the sealing of such arrangements is also interrupted but, however, for longer periods of time than is the case with the present invention.

According to another feature of the present invention, the inner and external channels 1, 2, 3 are formed with bottoms 8 which are inclined downwardly in the direction of the outlets 7, 7' and 7" as seen in FIGS. 3 and 4. In this manner, any dirt, dust and other debris which collects therein can be continuously and automatically rinsed from these channels through the respective outlets.

When the sealing arrangement of the present invention is utilized in connection with applications wherein particularly large amounts of dirt, dust and mud would be present, at least one of the external channels and preferably both of them are provided with their own rinsing devices, schematically illustrated at 6 in FIGS. 2 and 4. Such a rinsing device is preferably periodically activated after each collection of dust or, alternatively, after each filling operation. For this purpose, nozzle-shaped inlets for directing a jet of liquid are provided in each channel which direct the liquid in a longitudinal direction in each channel, the latter preferably being covered by sheet metal or the like. The particular number of inlet or rinsing devices 6 provided in each of the channels 1, 2, 3 can vary and will be determined in accordance with the amount of dust anticipated to be present in the respective channels and according to the size of the channel to be cleaned. The same considerations will govern the number of outlet openings 7, 7' and 7". Further, it is understood that the rinsing and outlet devices 6, 7 can be arranged at locations in the channels other than those illustrated in the accompanying drawings.

Due to the fact that the inner channel 1 is surrounded by two external channels 2, 3 which are supplied with their own respective outlet or drain openings 7, it will be understood that no liquid will overflow from the sealing arrangement into the opening 11 even when large pressure differentials exist between the interior sealed space and the external atmosphere. For this reason, the sealing apparatus of the present invention is especially adapted for use in connection with water-sensitive bulk materials. In this connection, the apparatus is particularly suitable for use in connection with the cooling bin of a coke-drying cooling installation without the usual risk that the liquid contained in the sealing channels will spill over onto the red-hot coke in the shaft cooler thereby causing a water-gas reaction. The sealing apparatus of the present invention is advantageous for the additional reason that the same is practically maintenance free and does not necessitate any continuous cleaning of dust or the like as is the case in conventional sealing arrangements.

Unlike the external channels 2, 3, the inner channel 1 is constantly rinsed by fresh water or other suitable liquid by means of the inlet or rinsing device 6 provided in the inner channel 1. The rinsing liquid overflows over one of the intermediate walls 5, 5' and is subsequently removed from the respective external channels 2, 3 by way of the liquid outlet 7' or 7" together with the accompanying mud and other debris via siphon 9.

It is understood that the present invention can be utilized not only in connection with cooling bins for coke-drying cooling installations but, additionally, for hot-coal filling devices in coking furnaces or, generally, for shaft furnaces or other bin-filling devices.

Obviously, numerous modifications and variations of the present invention are possible in the light of the above teachings. Accordingly, it is understood that within the scope of the appended claims, the invention may be practiced otherwise than as specifically disclosed herein.

What is claimed is:

1. In apparatus for peripherally sealing openings such, for example, as openings for feeding coke material into a bin, in a shaft for cooling hot bulk material, or a shaft in a blast furnace, wherein a channel having inner and outer sides is provided extending around the periphery of said opening into which a dividing wall extends whose lower end is spaced from the channel bottom so as to define a pair of adjacent channel portions which intercommunicate through the space between the lower end of the dividing wall and the channel bottom, said channel adapted to contain a liquid at least to an extent whereby said space is filled with the liquid, the improvement comprising:

a pair of external channels, each of said external channels extending around a respective one of the inner and outer sides of said peripherally extending channel directly adjacent thereto, so that the latter comprises an inner channel;

first and second intermediate walls being defined by the inner and outer sides of said inner channel and separating said pair of external channels from said inner channel, respectively;

a liquid inlet communicating with said inner channel; and liquid outlets communicating with said external channels;

whereby a liquid can be continuously supplied into said inner channel in a manner such that the liquid can continuously overflow over at least one of said intermediate walls into a respective one of said external channels from which liquid can then be removed in order to facilitate cleaning of said inner channel as well as effecting a liquid seal for said opening.

2. The combination of claim 1 further including means for periodically rinsing said external channels with a stream of liquid.

3. The combination of claim 2 further including at least one inlet means for directing a jet of liquid into at least said inner channel substantially in the longitudinal direction thereof.

4. The combination of claim 3 wherein said liquid jet directing means further includes means for directing a jet of liquid into said external channels substantially in the longitudinal direction thereof.

5. The combination of claim 1 wherein at least one liquid outlet is provided in the bottom of said inner and external channels whereby liquid and accumulated debris can be removed from said channels.

6. The combination of claim 5 further including a shutoff valve provided in said outlet provided in the bottom of said inner channel.

7. The combination of claim 5 wherein the bottom of each of said inner and external channels are inclined downwardly in the direction of said liquid outlets.

8. The combination of claim 5 further including siphon means communicating with each of said liquid outlets whereby the exchange of gas between channels is prevented.

9. The combination of claim 6 further including control means associated with said shut-off valve for periodically flushing debris from the inner channel during a complete emptying operation.

10. The combination of claim 1 wherein the exterior channel which extends around the inner side of said inner channel is situated outwardly and extends around the periphery of said opening.

* * * * *